Nov. 13, 1962 R. L. BIENVENUE ETAL 3,063,474
FILAMENT FEEDING, STRETCHING AND TRANSFER APPARATUS
Filed May 11, 1960 6 Sheets-Sheet 1

ROLAND L. BIENVENUE
ERNEST F. STACEY
SAMUEL E. SWASEY
INVENTORS

BY *Joseph C. Ryan*
ATTORNEY

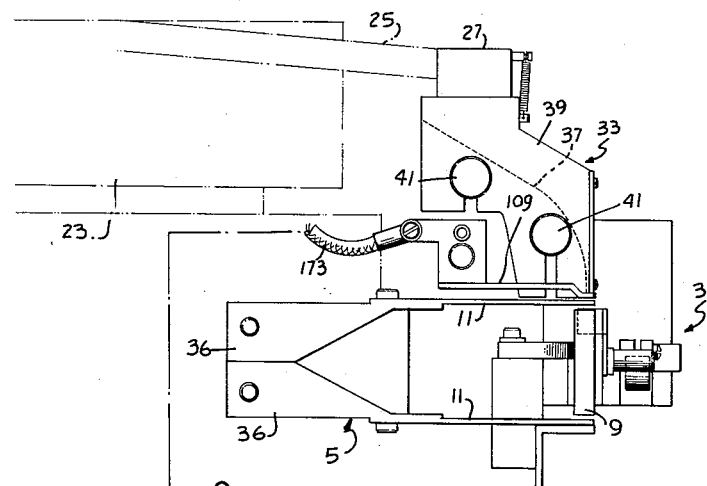
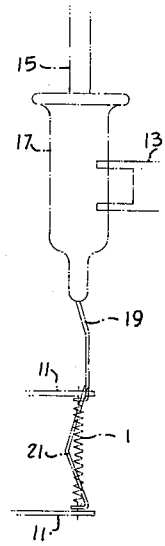
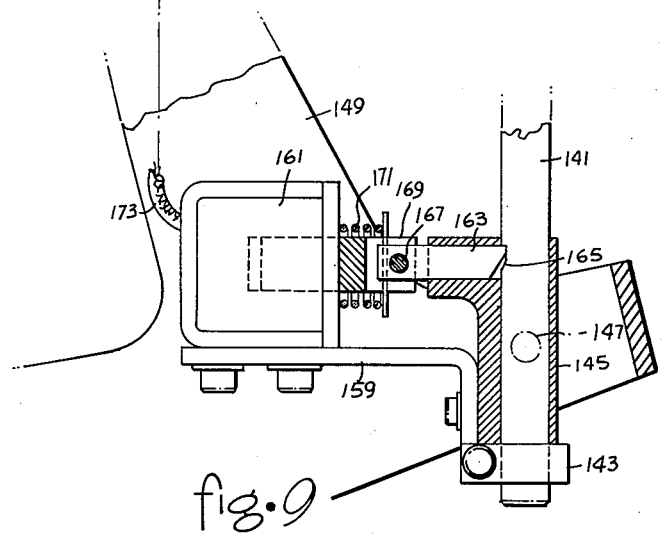

ROLAND L. BIENVENUE
ERNEST F. STACEY
SAMUEL E. SWASEY
INVENTORS

ATTORNEY

ROLAND L. BIENVENUE
ERNEST F. STACEY
SAMUEL E. SWASEY
INVENTORS

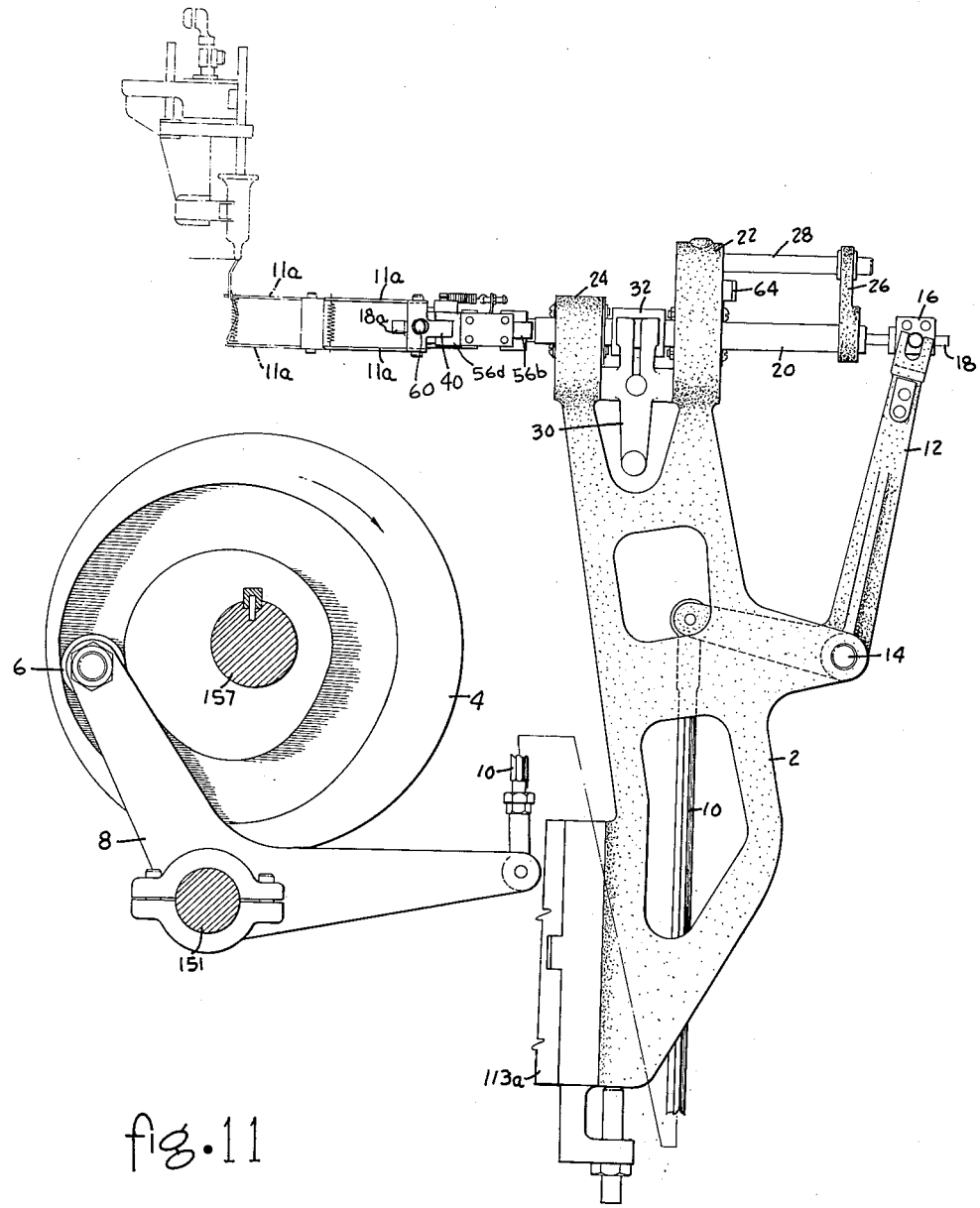

3,063,474
FILAMENT FEEDING, STRETCHING AND
TRANSFER APPARATUS
Roland L. Bienvenue, Lawrence, Ernest F. Stacey, Hamilton, and Samuel E. Swasey, Marblehead, Mass., assignors to Sylvania Electric Products Inc., a corporation of Delaware
Filed May 11, 1960, Ser. No. 28,258
8 Claims. (Cl. 140—71.6)

This invention relates to the manufacture of electric lamps and more particularly to the preparation of lamp filaments for the assembly thereof with support wires in the fabrication of lamp mounts.

In the manufacture of an electric lamp, a filament is supported by two or more support wires, usually including two lead-in wires. Supporting of the filament is usually effected by either welding or clamping the support wires to the ends of the filament. In the latter case, the support wires are usually provided with hooked ends, the filament is positioned with the ends thereof extending through these hooks, and then the hooks are closed about the ends of the filament.

One of the most important controls which must be exercised in the manufacture of electric lamps is the maintenance, within very close tolerances, of substantially uniform effective electrical length and physical configuration of the lamp filaments from lamp to lamp in order to obtain substantially uniform lamp characteristics and a relatively high degree of luminous efficiency. This factor of effective electrical length of the filament is a function of the over-all length of the wire itself, the t.p.i. (turns per inch) of the primary coiling and, in the case of coiled coils, the t.p.i. of the secondary coiling.

In the fabrication of these lamp filaments, a very high degree of uniformity can be and is attained when the individual filaments are shaped and cut on a coiling machine. However, subsequent manufacturing operations on this article of work, before the filament is presented to the lead-in wires on which it is to be mounted, tend to affect this uniformity adversely. In these subsequent operations, the mandrel on which the coiled filament was wound is removed, the filament is heat-treated and finally placed in an article-orienting apparatus from which it is fed to an article transfer apparatus which presents the filament to the lead-in wires. Removal of the mandrel and heat-treating of the filament are batch operations, i.e., these operations are performed on a large number of filaments randomly disposed in a suitable vessel. Similarly, a large batch of filaments are dumped into an article orienting apparatus which effects disentanglement of the filaments from one another and guides them one at a time to a discharge point. Since the spring-back characteristic of these filaments can vary even within any given batch, it will be readily understood and appreciated that there are bound to be substantial variations from filament to filament even within a given batch of filaments as a result of these manufacturing operations performed on the work.

Various devices and techniques have been used in the industry in an effort to attain the acknowledgedly desirable goal of a high degree of uniformity. One of these efforts involved the application of an end-on force simultaneously to each end of the filament just before its transfer to the lead-in wires to effect a sort of compression of the coiled filament. While this technique was not without merit, it still left much to be desired because of the tendency of the coiled filaments to elongate various amounts as soon as this compressing force was removed. Another technique involved adjusting the lead tip spacing, i.e., the distance between the ends of the lead-in wires to which the filament is to be attached. This is a rather impractical approach to the problem, particularly in high speed manufacturing operations, when it is realized that substantial variations can be encountered among the coiled filaments of any given batch of filaments.

In view of the foregoing, one of the principal objects of this invention is to provide a method of attaining a high degree of uniformity of coiled filaments as they are fed to the wires which are to support them in the manufacture of lamp mounts.

Another object of this invention is to provide an apparatus for attaining a high degree of uniformity of coiled filaments as they are fed to the wires which are to support them in the manufacture of lamp mounts.

A further object is to provide an apparatus of the type just mentioned which is readily adaptable and useable in high speed manufacturing operations.

One of the features of this invention is its adaptation and use in combination with means for orienting a filament vertically in the manufacture of lamps in which the longitudinal axis of the coiled filament is substantially parallel to the longitudinal axis of the lamp envelope.

These and other objects, advantages and features are attained in accordance with the principles of our invention by re-orienting filaments fed one at a time horizontally from an article feeding apparatus and presenting them vertically to a nest, stretching the filament until a pre-determined t.p.i. has been obtained and then presenting the filament, while positively maintaining it in the stretched state, to the wires of the lamp mount which are to support it. More particularly, when the coiled filament is located in the nest, the leg of the filament projecting from one end thereof is caused to engage a stop, thus locating this end of the filament. The filament is then stretched until the leg of the filament projecting from the other end thereof engages another stop. Stretching of the filament is then terminated. Since the spacing between these two stops is a pre-determined distance, all coiled filaments, after they have been stretched, will have substantially the same t.p.i., even though some of them will have been stretched more than others because of the non-uniformity of the coiled filaments coming into this operation as noted above. In the specific embodiment of the invention described below, a pair of blades are advanced between the turns of the coiled filament, one near each end thereof, and one of these blades is actuated to effect the stretching of the filament. These blades maintain the filament in the stretched state until a pair of transfer jaws grip the stretched filament for transfer to the lead-in wires which are to receive it.

In the specific embodiment of the invention illustrated in the accompanying drawings and described below, FIGURE 1 is a plan view of the filament stretching apparatus and the filament transfer apparatus, showing their relative location with respect to one another and with respect to the path traversed by the heads of a lamp stem fabricating apparatus.

FIGURE 2 is a fragmentary side elevational view of the apparatus of FIGURE 1 along the line 2—2 of FIGURE 1.

FIGURE 9 is an enlarged fragmentary detail of the mechanism employed to arrest the action of the filament stretching blades on the filament after the filament has been stretched the desired amount.

FIGURE 11 is a side elevational view of the filament transfer apparatus and its associated actuating mechanisms.

Figure 1:
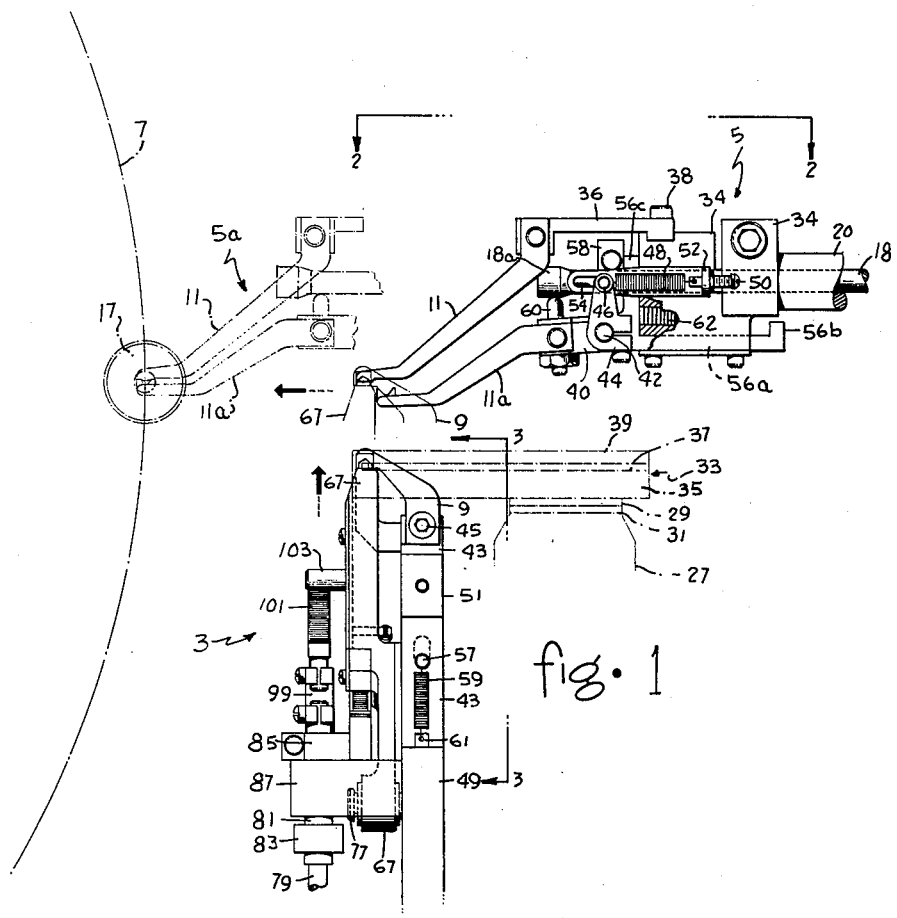

Referring now to the drawings, particularly FIGURE 1 thereof which is a plan view, it will be noted that the filament stretching apparatus, indicated generally by the reference number 3 and the filament transfer apparatus, indicated generally by the reference number 5, are disposed adjacent to one another, the former presenting filaments one at a time to the latter. Certain portions of the filament stretching apparatus 3 reciprocate between a filament receiving position and a filament delivery position. Similarly, the filament transfer apparatus 5 reciprocates between a filament receiving position and a filament delivery position. The filament delivery position of the filament transfer apparatus 5 is shown in phantom and identified as 5a in FIGURE 1. In this position, a filament is presented to a lamp stem at the filament mounting station of a lamp stem fabricating apparatus, such as the apparatus shown in U.S. Patent 2,637,144 for example. A fragmentary portion of the path transversed by a lamp stem on this apparatus is shown in phantom in FIGURE 1 and is identified by reference number 7.

A further general understanding of the invention may be obtained from a preliminary study of FIGURE 2 which is a side elevational view looking into the apparatus from a position which corresponds with the top of the sheet on which FIGURE 1 appears. Filaments are fed one at time to a filament nest 9 of the filament stretching apparatus 3. After the filament stretching operation has been effected and the stretched filament has been moved to the filament delivery position of the filament stretching apparatus, two pairs of fingers 11 and 11a of the filament transfer apparatus 5 grip the filament and deliver it to a lamp stem on the lamp stem fabricating apparatus. As shown in phantom in FIGURE 2, a holder 13 on the lamp stem fabricating apparatus supports a lamp stem which comprises an exhaust tube 15, a flare 17 and a pair of lead-in wires 19 and 21. The lead-in wires 19 and 21 are provided with hooks on the ends thereof to receive the filament 1. With the filament 1 so positioned, the hooks on the ends of the lead-in wires 19 and 21 are closed by suitable means not shown and the fingers 11 are retracted.

The manner in which filaments 1 are presented one at a time to the filament nest 9 of the filament stretching apparatus 3 is illustrated in FIGURES 1 and 2. Since the manner in which filaments are fed one at a time from a mass of filaments forms no part of this invention, one means which may be employed is shown rather sketchily and in phantom for the most part. Apparatus such as that shown and described in detail in U.S. Patent 2,760,679 may be employed. As is shown in that patent, and is shown in part in FIGURES 1 and 2 of this application, a mass of filaments disposed in a vibratory bowl feeder 23 are disentangled, segregated and caused to flow therefrom one at a time through a channel 25 to a chute 27. From the chute 27, the filaments fall onto a pair of cooperating, reciprocating slides 29 and 31, the slide 29 delivering one filament at a time to a suitable filament receiving member and the slide 31 returning excess filaments to the vibratory bowl feeder 23. In the referenced Patent 2,760,679, the filament receiving member is a transfer arm. In this application, and in accordance with this invention, the filament receiving member is a chute assembly 33 which not only contains the filament dropped onto it from the slide 29 but also re-orients it so that it drops vertically into the filament nest 9 of the filament stretching apparatus 3. The chute assembly 33 comprises three plate-like members 35, 37 and 39 attached to one another by screws 41. Member 35 is the base plate, member 37 is the chute and member 39 is a cover plate.

A filament 1 ready for the several operations to be performed thereon by the filament stretching apparatus 3 when it is disposed in the nest 9 thereof. This sequence is illustrated in FIGURES 3–7 and may be described generally as a stretching of the filament to a predetermined length and a presentation of the filament so stretched to the fingers 11 and 11a of the transfer apparatus 5.

Figure 3:
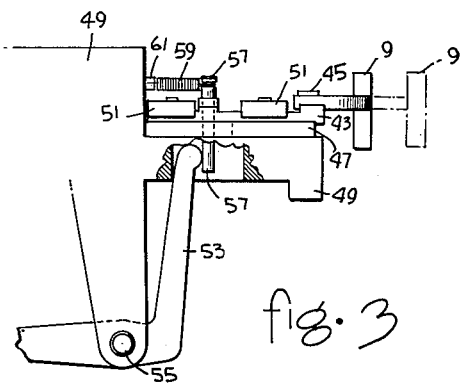
FIGURE 3 is a fragmentary side elevational view of the forward end of the filament stretching apparatus showing particularly the coil nest and the means for advancing the same.

Referring first to FIGURE 3, although many of the parts shown in elevation in this figure may be seen also in FIGURE 1 in plan, the filament nest 9 is attached to a slide 43 by screw 45. The slide 43 is reciprocable on a spacer 47 which is attached to base plate 49 by screws 51. The filament nest 9 is advanced from the position shown in solid to the position shown in phantom, for purposes hereinafter described, by a lever 53 pivotally mounted at 55 on base plate 49. Lever 53 engages a pin 57 near one end thereof. The pin 57 is mounted on slide 43 and extends through suitable elongated slots provided therefor in the spacer 47 and the base plate 49. One end of a spring 59 is connected to the other end of pin 57, the other end of the spring 59 being connected to a pin 61 projecting from a face of base plate 49. Thus when lever 53 is rotated clockwise about its pivot 55, it pushes forward the pin 57 which it normally engages, thus advancing the slide 43 on which the filament nest 9 is mounted. The spring 59 insures a positive return of the slide 43 when the lever 53 rotates counter-clockwise.

Figure 4:
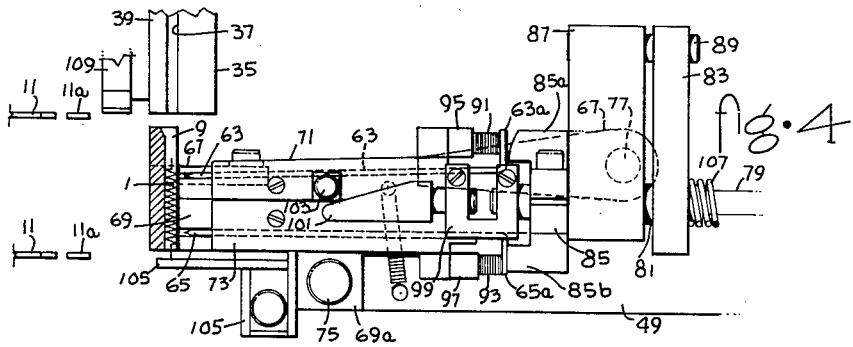
FIGURE 4 is a side elevational view of the filament stretching apparatus in its rest position.

Referring now to FIGURE 4, the first step in the operation of the filament stretching apparatus, after a filament has been deposited in the nest 9, is the introduction of the tips of a pair of blades 63 and 65 between turns of the coiled filament 1 near each end thereof. Substantially simultaneously therewith, the base plate 49, on which the nest 9 is supported through slide 43 and spacer 47 as just described, is also advanced slightly to move the nest 9 out of register with chute 37 and into register with an upper filament stop 109. The means employed to effect this forward movement of base plate 49 will be described below. The blades 63 and 65 and the several parts of the apparatus associated therewith are shown in the retracted position in FIGURE 4 and in the advanced position in FIGURE 5. The blade 63 is the upper blade, and blade 65 is the lower blade. The upper blade 63 is slidably disposed in an elongated slot extending longitudinally of an upper blade holder 67. The lower blade 65 is similarly disposed in a lower blade holder 69. Since these longitudinally extending slots which receive the blades 63 and 65 are cut through a side of each of the holders 67 and 69, the blades are prevented from being displaced laterally by cover plates 71 and 73 respectively. The lower blade holder 69 is provided with a lateral extension 69a formed integral therewith and through which screw 75 extends to effect attachment of blade holder 69 to base plate 49. The rearward end of the upper blade holder 67 is somewhat larger than the forward end, as shown in phantom in FIGURE 4, and is pivotally mounted at 77 on the base plate 49 (see also FIG. 1).

The primary actuating means of the filament stretching apparatus 3 is a shaft 79 (FIGS. 1 and 4). The shaft 79 extends through and is freely slidable within a bushing 81. A block 83 is attached to the bushing 81 near one end thereof and a block 85 is attached to this bushing near the other end thereof. The primary support for these several members is a bearing block 87 which, as may be seen in FIGURE 1, is attached to a side face of base plate 49. The bushing 81 extends through and is freely slidable within the bearing block 87. The bearing block 87 is provided with a rearwardly extending guide pin 89 which extends through an aperture therefor in block 83, the block 83 being slidable thereon.

As was mentioned above, the blades 63 and 65, the tips of which are to be introduced between turns of the coiled filament 1, are slidably disposed in elongated slots in their respective blade holders 67 and 69. The blades 63 and 65 are long flat metal pieces provided with laterally extending tabs 63a and 65a respectively at one end thereof (FIG. 4), thus providing a bearing surface for the means to effect movement of the blades within their holders. The block 85 is provided with projections 85a and 85b which abut one face of each of the tabs 63a and 65a respectively. The other face of each of the tabs 63a and 65a is engaged by an end of a spring 91 and a spring 93 respectively. The other end of each of these springs 91 and 93 seats in a spring pocket 95 and a spring pocket 97 respectively. The spring pockets 95 and 97 are attached to blade holders 67 and 69 respectively.

As was mentioned above, the shaft 79 is the primary actuating means of the filament stretching apparatus 3, the shaft 79 extends through and is slidable within a bushing 81 and the bushing 81 has a block 83 fixedly mounted thereon adjacent to one end thereof and a block 85 fixedly mounted thereon adjacent to the other end thereof. The forward end of shaft 79 has one leg of a U-shaped clamp 99 attached thereto. A finger-like cam 101 is attached to the other leg of the clamp 99 and is engaged by a pin 103 projecting laterally from the cover plate 71 which is attached to upper blade holder 67.

Figure 5:
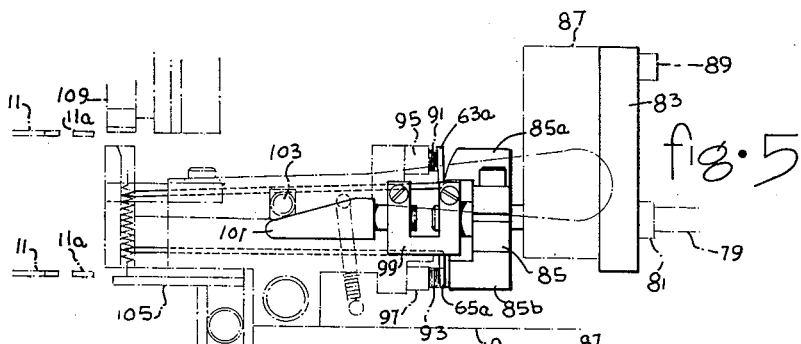
FIGURE 5 is a side elevational view of the filament stretching apparatus showing the blades which effect the stretching of the filament in their advanced position with the tips thereof disposed between turns of the coiled filament.

The operation of the filament stretching apparatus 3 will now be described, reference being made particularly to FIGURES 4–7 wherein the sequence of operations is illustrated. As soon as a filament 1 has been fed from the slide 37 and has dropped into the nest 9 coming to rest with the lower end thereof resting on a shelf-like filament stop 105 attached to base plate 49, the forward stroke of the shaft 79 is initiated. During the first phase of the forward stroke of shaft 79, the blades 63 and 65 are advanced to effect insertion of the tips thereof between coil turns of the filament 1 as shown in FIGURE 5. As the shaft 79 starts its forward motion, a compression spring 107, which is concentric with shaft 79 and bushing 81 and which abuts block 83, pushes the block 83 forward and displaced the block 83 from the position thereof shown in FIGURE 4 to the position thereof shown in FIGURE 5. Forward movement of block 83 is transmitted into a similar forward movement of block 85 since both blocks are fixedly mounted on bushing 81. Since projections 85a and 85b of block 85 abut tabs 63a and 65a respectively of blades 63 and 65 respectively, the blades are caused to advance a distance similar to the distance through which blocks 83 and 85 have been caused to move. This places the tips of the blades between coil turns of the filament 1 as shown in FIGURE 5. Since block 83 now abuts bearing block 87 which is fixedly mounted on base plate 49, further forward movement of shaft 79 will not effect any further relative displacement between these two blocks and thus the forward movement of the blades 63 and 65 within their blade holders has been completed.

As the shaft 79 continues its forward stroke, the cam 101, which is connected thereto through the U-shaped clamp 99, moves forward. Forward movement of the cam 101 displaces the pin 103 lying in its path and thus causes a clock-wise rotation of upper blade holder 67 about its pivot 77 on the base plate 49. This movement of blade holder 67 effects a stretching of filament 1, as may be seen in FIGURE 6, and continues until the upper end of the filament 1 touches an upper filament stop 109. Electrical means, to be described below, effects a termination of the forward stroke of shaft 79, and thus arrests the clockwise rotation of upper blade holder 67, as soon as the upper end of filament 1 engages the upper filament stop 109.

With the filament 1 now elongated to the desired predetermined length, it is now ready to be presented to the fingers 11 and 11a of the transfer apparatus 5. As will be noted from an examination of FIGURE 1, the fingers 11 and 11a of the transfer apparatus 5 are located some distance from the forward end of the filament stretching apparatus 3. It is necessary therefore to advance the filament stretching apparatus forward so that the fingers 11 and 11a of the transfer apparatus can grasp the filament 1. This is accomplished by advancing the base plate 49 (and hence everything mounted on or supported therefrom), by means to be described below, until the nest 9 on the forward end of the filament stretching apparatus 3 is in the position shown in phantom in FIGURE 1. With the nest 9 so positioned, the fingers 11 and 11a of the transfer apparatus close on the legs of the stretching filament as shown in FIGURE 7. (It will be noted that in FIGS. 4–6 these fingers are open.) Although the filament 1 is now gripped by the fingers 11 and 11a, the filament is still in the nest 9 and thus the nest must be moved out of encompassing relationship with respect to the filament 1 before the transfer stroke of the fingers 11 and 11a is initiated. This is accomplished by the lever 53 (FIG. 3). Actuation of the lever 53 to effect clockwise rotation thereof about its pivot 55 is effected by means to be described below. When so actuated, the lever 53 pushes the pin 57 forward. Since the pin 57 and the nest 9 are both mounted on slide 43, the nest 9 is advanced from the position shown in solid to the position shown in phantom, thus moving out of encompassing relationship with respect to the filament and freeing it for transfer by the fingers 11 and 11a of the transfer apparatus 5.

In the description just completed of those parts of the filament stretching apparatus 3 immediately associated with the article of work, it was indicated in several passages that the means for actuating some of these parts would be described below. This will now be done, reference being made particularly to FIGURES 8 and 9.

Figure 8:
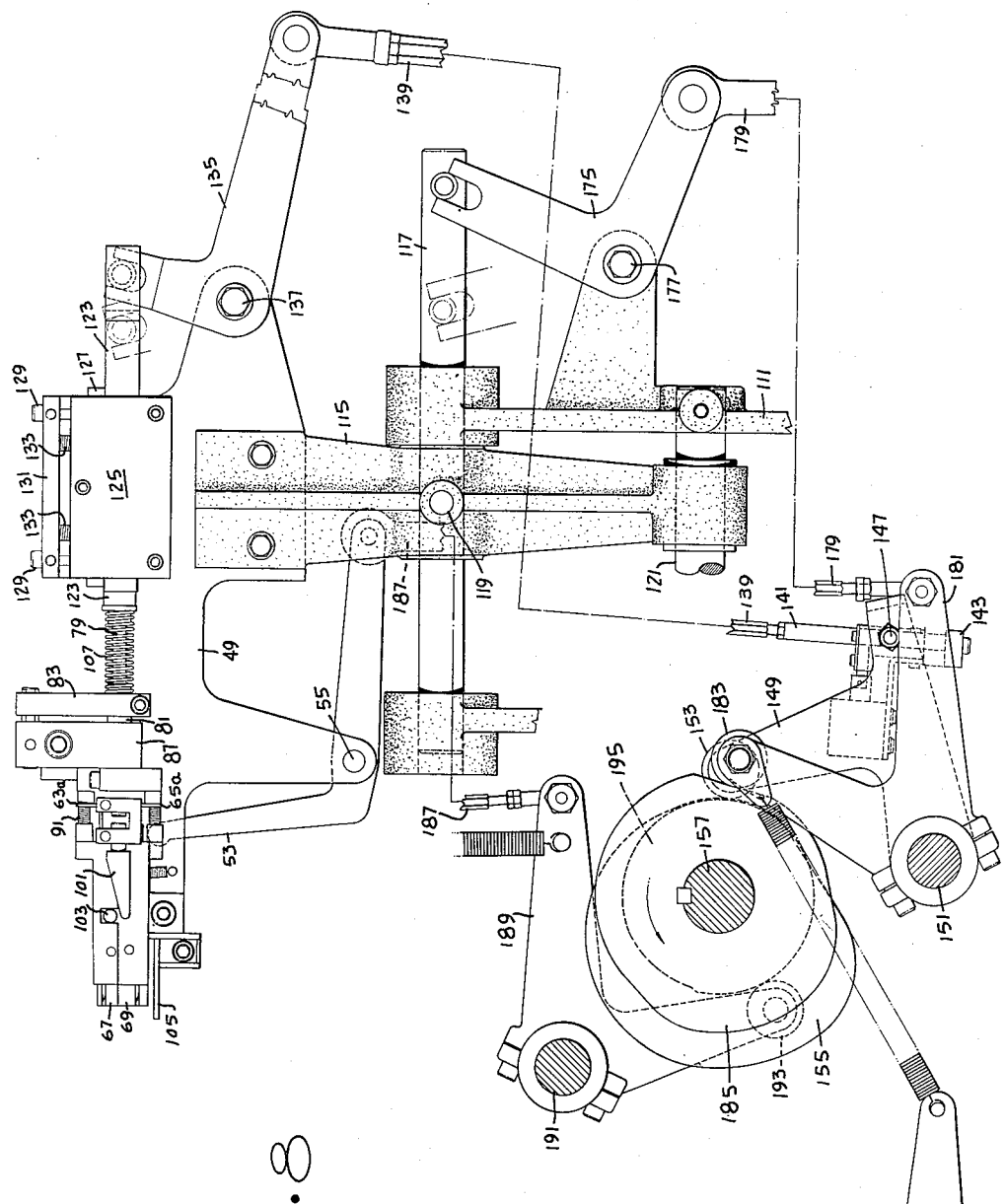
FIGURE 8 is a side elevational view of the filament stretching apparatus and its associated actuating mechanisms.
Figure 10:
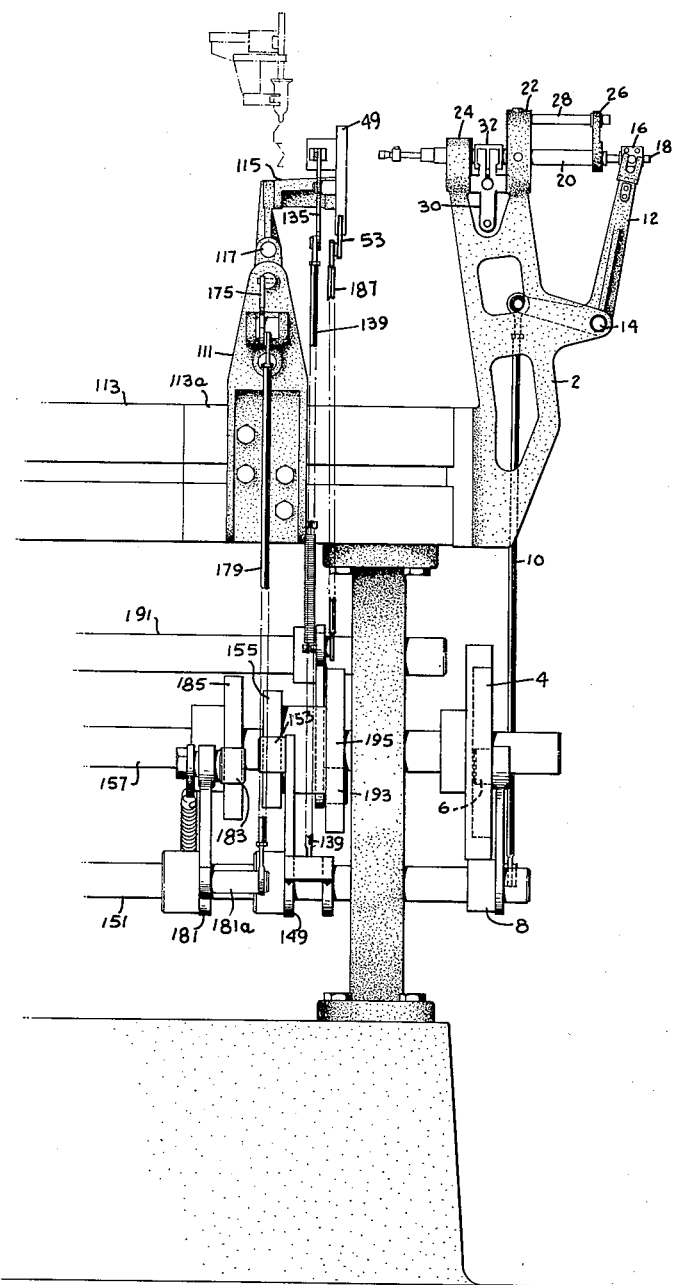
FIGURE 10 is a side elevational view of the end of a lamp stem fabricating apparatus with which the apparatus of this invention is associated, showing particularly the drive means for both the filament stretching and the filament transfer apparatus.

The primary support for the filament stretching apparatus 3 is a bracket 111 which, as shown in FIGURE 10, is attached to extension 113a of the chassis 113 of a lamp stem fabricating apparatus of the type mentioned above and shown in U.S. Patent 2,637,144. Referring now primarily to FIGURE 8, the base plate 49 of the filament stretching apparatus 3 is mounted on an arm 115. The arm 115 is pinned to a shaft 117 at 119 and is further supported by and slidable on shaft 121. Shafts 117 and 121 are supported by bracket 111.

As described above, shaft 79 actuates the upper blade holder 67 through cam 101 and pin 103 to effect the stretching of filament 1. The rear end of shaft 79 is fitted into the forward end of friction bar 123. The friction bar 123 extends through a friction block 125, the upper face of friction bar 123 being in frictional engagement with a gib 127 which is disposed within the friction block 125. The amount of frictional force between the gib 127 and the bar 123 is adjustable, this adjustment being made by manipulation of screws 129. Screws 129 extend through an adjustment plate 131 and into friction block 125. Compression springs 133 bottom in adjustment plate 131, extend through apertures provided therefor in the top of friction block 125 and engage gib 127. Thus when screws 129 are turned down, a greater compression force is exerted on the springs 133 through the plate 131 and these springs 133, in turn, pressing on the gib 127, increase the friction between the gib 127 and the friction bar 123. This arrangement is provided in order to make sure that after the filament 1 has been stretched the desired amount as described above, and before the filament transfer fingers 11 of the filament transfer apparatus 5 actually grasp the filament, the filament will be maintained in the same stretched position. In other words, this friction block assembly prevents the friction bar 123 and the shaft 79 from slipping forward or backward during the time interval between completion of filament stretching and the time the transfer fingers 11 actually grasp the stretched filament.

Reciprocation of friction bar 123 is effected by a lever 135 pivotally mounted intermediate its ends at 137 on base plate 49. One end of lever 135 is connected to an end of friction bar 123 and the other end of lever 135 is connected to an end of connecting rod 139. The other end of connecting rod 139 fits into an end of a latch bar 141.

Figure 6:
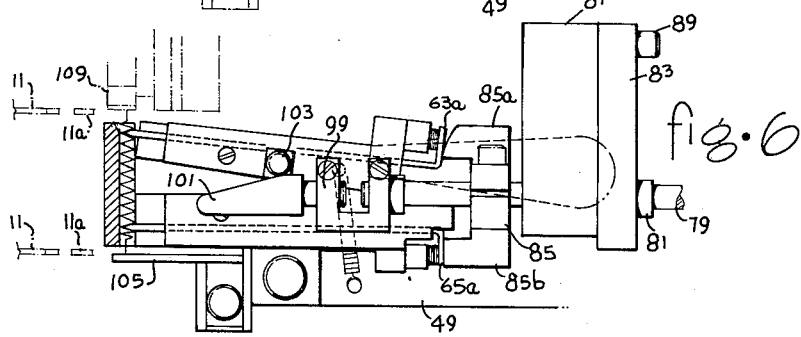
FIGURE 6 is a side elevational view of the filament stretching apparatus showing the coiled filament in the stretched position.
Figure 7:
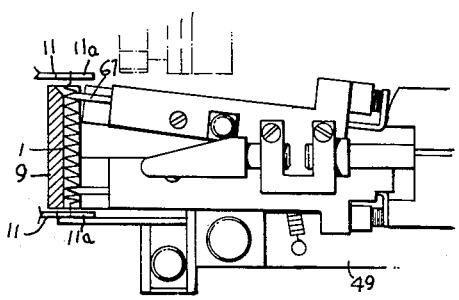
FIGURE 7 is a fragmentary side elevational view of the filament stretching apparatus showing it in its advanced position with the stretched filament gripped by the jaws of the filament transfer apparatus.

Before describing the mechanism associated with latch bar 141, it should be recalled that, as described above, stretching of the filament 1 is effected by clockwise rotation of upper blade holder 67, actuation of the blade holder 67 being effected by the forward stroke of shaft 79 through cam 101 and pin 103 (FIGS. 4–6). It was also pointed out above that electrical means are provided for arresting the stretching of the filament 1 as soon as the upper end thereof touches upper filament stop 109 (FIG. 2). As described immediately above, the friction block 125 and its associated parts "freeze" the shaft 79 and the friction bar 123 in position to maintain the stretched filament 1 in position until it is grasped by the fingers 11 of the article transfer apparatus. The means provided for doing these things will now be described.

Referring first to FIGURE 9, the friction bar 141 is provided with a stop collar 143 attached thereto near the lower end thereof. A pivot block 145 is slidably disposed on latch bar 141 and normally rests on stop collar 143. The pivot block 145 is pivotally mounted on a pair of pivot pins 147 (one of which is shown in FIGURE 9) in the sides of a U-shaped rocker arm 149 (FIG. 10). As shown in FIGURES 8 and 10, the rocker arm 149 is mounted on a rocker arm shaft 151 and supports a cam follower 153 which rides on cam 155 on cam shaft 157. Referring back now to FIGURE 9, a bracket 159, attached to pivot block 145, has a solenoid 161 mounted thereon. A latch pin 163 is slidably disposed within pivot block 145. The forward end of latch pin 163 normally interlocks with the latch bar 141 in a notch 165 provided therefor, as shown in FIGURE 9. The rear end of latch pin 163 is pinned at 167 to the forward end of solenoid plunger 169. Compression spring 171 insures a firm, positive seating of latch pin 163 in the notch 165 provided therefor in latch bar 141.

The operation of this mechanism will now be described, reference being made first to FIGURE 8. With the friction bar 123 and the shaft 79 on the forward end thereof in the position shown in this figure, forward motion thereof to effect a stretching of the filament 1 as described in detail above in connection with FIGURES 4–6 is effected by cam 155. The contour of the cam 155 is such that during the first phase of the operating cycle, the rocker arm 149 rotates counter-clockwise on its shaft 151 and this counter-clockwise rotation of rocker arm 149 is translated into upward movement of connecting rod 139 through (FIG. 9) pivot pins 147, pivot block 145, latch pin 163 and latch bar 141. Upward movement of connecting rod 139 is translated into forward motion of friction bar 123 and the shaft 79 through lever 135 (FIG. 8). Forward motion of shaft 79 effects insertion of blades 63 and 65 between turns of filament 1 and then clockwise rotation of the upper blade holder 67 until the upper end of the stretched filament touches upper filament stop 109, as described above in connection with the description of FIGURES 4–6. Engagement of the upper filament stop 109 by the stetched filament terminates the forward stroke of friction bar 123 and shaft 79 in the following manner. Filament stop 109 (FIG. 2) is electrically connected through cable 173 to solenoid 161 (FIG. 9). Thus when the filament 1 touches the stop 109, it energizes solenoid 161 and effects a rearward movement of solenoid plunger 169. This in turn withdraws latch pin 163 from its interlocking engagement with latch bar 141 and breaks the mechanical connection between rocker arm 149 and connecting rod 139. Although further counter-clockwise rotation of rocker arm 149 takes place, the pivot block 145 which is pivotally mounted thereon merely slides upwardly on the latch bar 141. During this period of lost motion the friction block 125 and its associated parts, as described above, "freezes" the friction bar 123 and the shaft 79 in position so that the filament 1 will be maintained in its stretched position until it is grasped by the fingers 11 and 11a of the filament transfer apparatus 5.

The next phase in the operation of the filament stretching apparatus 3 is the presentation of the stretched filament 1 to the fingers 11 and 11a of the filament transfer apparatus 5 (FIG. 1). This is accomplished by an advancement of base plate 49 to a position where the fingers 11 and 11a of the filament transfer apparatus 5 can grasp the ends of the filament. Portions of filament nest 9 and the upper blade holder 67 are shown in phantom in this position in FIGURE 1. The forward end of the filament stretching apparatus 3 is also shown in this forward position in FIGURE 7. As was described above, the base plate 49 is mounted on arm 115 which is pinned to shaft 117 and is supported by and slidably disposed on shaft 121, both of these shafts being supported in bracket 111. Reciprocation of shaft 117 to advance arm 115 and base plate 49 is effected by counter-clockwise rotation of lever 175. Lever 175 is pivotally mounted intermediate its ends at 177 on bracket 111, one end of lever 175 being connected to shaft 117 and the other end thereof being connected to a connecting rod 179. As may be seen in FIGURES 8 and 10, the other end of connecting rod 179 is connected to an extension 181a (FIG. 10) of rocker arm 181 which is mounted on rocker arm shaft 151. The other end of rocker arm 181 is provided with a cam follower 183 which rides on cam 185 on cam shaft 157. Thus counterclockwise rotation of rocker arm 181 under the influence of cam 185 is translated into upward movement of connecting rod 179, counter-clockwise rotation of lever 175 and forward movement of shaft 117 to effect advancement of base plate 49 and the stretched filament 1 disposed in nest 9 at the forward end of the base plate 49 to the position shown in FIGURE 7.

At this point the fingers 11 and 11a of the filament transfer apparatus 5 grasp the filament at the ends thereof and are ready to effect the transfer. However, before this is done, as described above, the nest 9 is displaced from encompassing relationship with respect to the filament. As described above in connection with FIGURE 3, this is accomplished by advancement of slide 43 on the end of which nest 9 is mounted, and slide 43 is, in turn, advanced by rotation of lever 53 about its pivot 55 (clockwise in FIG. 3 and counter-clockwise in FIG. 8). Referring now to FIGURES 8 and 10, a connecting rod 187 connects lever 53 to an end of rocker arm 189 which is mounted intermediate its ends on rocker arm shaft 191. The other end of rocker arm 189 is provided with a cam follower 193 which rides on cam 195 on cam shaft 157. The contour of cam 195 is such that as soon as the base plate 49 and associated parts have been advanced to bring the filament nest 9 into the position shown in FIGURE 7 and the fingers 11 and 11a have grasped the ends of the filament, the rocker arm 189 is deflected counter-clockwise (FIG. 8), thus pushing connecting rod 187 upwardly and causing counter-clockwise rotation of lever 53 (FIG. 8) about its pivot 55. In FIGURE 3, this is clockwise rotation of lever 53 and, through pin 57, it effects advancement of filament nest 9 to the position thereof shown in phantom in this figure. The fingers 11 and 11a of the filament transfer apparatus 5 then effect the transfer.

The filament transfer apparatus 5 will now be described, reference being made initially to FIGURE 1. As shown in this figure, the fingers 11 and 11a of this apparatus receive a filament from the filament stretching apparatus 3 and present it to a lamp stem, a fragmentary portion of the filament transfer apparatus being shown in phantom in the delivery position.

The drive means and the means for supporting the filament transfer apparatus is shown in FIGURES 10 and 11. The main support member for this apparatus is a bracket 2 mounted on the end of extension 113a of chassis 113. Actuation of the transfer apparatus is effected by a cam 4 mounted on cam shaft 157. A cam follower 6, supported on one end of a rocker arm 8, rides in a channel cut therefor in the cam 4. The rocker arm 8 is mounted, intermediate its ends, on rocker arm shaft 151. A connecting rod 10 connects the other end of rocker arm 8 to an end of a lever 12. The lever 12 is pivotally mounted intermediate its ends at 14 on bracket 2. The other end of lever 12 is connected through block 16 to shaft 18 on which the block is fixedly mounted. The shaft 18 extends through and is slidable within a sleeve 20. The sleeve 20 extends through and is slidable within hubs 22 and 24 of bracket 2. One end of a guide arm 26 is attached to an end of sleeve 20, the other end thereof being slidable on guide rod 28 which is mounted in hub 22 and projects rearwardly therefrom. Although, as just mentioned, the sleeve 20 is slidable within hubs 22 and 24, it is frictionally supported by a pair of spring-loaded friction arms 30, pivotally mounted in the bracket 2 between the hubs 22 and 24, through a split bushing 32 through which the sleeve 20 extends.

The primary support member for the fingers which grasp the filament and their associated parts is a mounting block 34 which is clamped to the forward end of sleeve 20 (FIG. 1). A pair of fixedly mounted finger supports 36 (upper and lower, the upper one being shown in the plan view, FIG. 1) are attached at one end thereof to block 34 by screws 38, the other end thereof having a finger 11 fixedly mounted thereon. A generally T-shaped pivotally mounted finger support 40, to which both fingers 11a shown in FIGURE 11 are attached, is fixedly attached to a pin 42. Referring back to FIGURE 1, one end of a spring lever 44 is clamped to pin 42, the other end thereof being provided with a pin 46 which extends therethrough. One end of a spring 48 is connected to that portion of pin 46 which projects upwardly from the top surface of spring lever 44. The other end of spring 48 is connected through adjusting screw 50 to an end of plate 52 which is attached to the top surface of block 34. The plate 52 is provided, near the other end thereof, with an elongated slot 54 within which rides that portion of pin 46 which extends downwardly from the bottom surface of spring lever 44. A generally L-shaped slide 56 is provided with a yoke extension 56d at the junction of the legs thereof, the leg of T-shaped finger support 40 fitting into this yoke extension and the pin 42 extending through the yoke extension as well as the leg of the finger support, thus connecting these members to one another. Leg 56a of the slide is slidable within and extends through block 34, the free end of leg 56a terminating in a flange 56b. Leg 56c of slide 56 extends along and normally abuts a side face of block 34 and lies between said block 34 and a stop block 58 mounted on and projecting laterally from shaft 18. The forward end of shaft 18 has a node 18a formed thereon. A camming pin 60, mounted intermediate the ends of the cross portion of T-shaped finger support 40, is normally in frictional engagement with the node 18a of shaft 18.

The operation of the filament transfer apparatus 5 will now be described. In its rest position, this apparatus is disposed as shown in FIGURE 1, i.e., in position to receive a stretched filament disposed in the nest 9 of the filament stretching apparatus 3. Upon completion of the forward stroke of base plate 49 and its associated parts of the filament stretching apparatus 3 to the position a portion of which is shown in phantom in FIGURE 1, the fingers 11 and 11a, as shown in FIGURE 7, grasp the filament while it is still in its nest. The manner in which this is accomplished will now be described, reference being made initially to FIGURES 10 and 11. The contour of cam 4 is such that during the initial phase of the operation of the filament transfer apparatus 5, the rocker arm 8 is rotated counter-clockwise (in FIG. 11) thus pushing connecting rod 10 upwardly and causing lever 12 to rotate counter-clockwise and advance shaft 18.

This first phase of operation effects advancement of the shaft 18 until the forward face of block 16 which is attached thereto strikes the adjacent end of sleeve 20. This relatively short forward movement of the shaft 18 effects an alignment of and closing of the fingers 11a with the fingers 11 about the legs of the filament as shown in FIGURE 7. The manner in which this is accomplished will now be described, reference being made to FIGURE 1. As the shaft 18 moves forward, the stop block 58 fixedly mounted thereon moves with it, thus freeing the leg 56c of slide 56 which, as pointed out above, lies between stop block 58 and mounting block 34. A compression spring 62, recessed primarily in block 34 and extending into a pocket provided therefor in the leg 56c of the slide 56, pushes the slide 56 forward until the flange 56b of the slide strikes the adjacent face of block 34 and thus prevents further forward movement of the slide. Forward movement of slide 56 effects a similar forward movement of finger support 40 since these members are connected to one another by pin 42. Since spring lever 44 is fixedly mounted on this pin 42, the lever 44 will also move forward and thus tend to place a load on spring 48.

At this point the tips of fingers 11a have been brought into alignment with the tips of fingers 11. Although further forward movement of slide 56 has been arrested, the block 16 has not yet quite reached engagement with the sleeve 20 (FIG. 11). During this remaining increment of travel of shaft 18, the fingers 11a are closed with the fingers 11 with the legs of the filament clasped therebetween.

Closing of the fingers 11a with the fingers 11 is effected by the relative displacement of the node 18a on the end of shaft 18 (FIG. 1) and the camming pin 60. It will be recalled that the T-shaped finger support 40, the slide 56 and the spring lever 44 are all mounted on a common member, pin 42. Thus, as the shaft 18 moves forward, the camming pin 60, which is mounted in finger support 40, will be in engagement with a narrowing portion of shaft 18, being drawn inwardly to a continued firm engagement with the shaft by spring lever 44, to which finger support 40 is connected by pin 42. Clockwise rotation of spring lever 40, to keep camming pin 60 in continued engagement with the shaft 18 and thus cause the fingers 11a to rotate clockwise about the pivot 42 of their finger support 40 to their closed position with respect to fingers 11, is effected by loaded spring 48 to which the spring lever is connected by pin 46, the lower end of which rides in slot 54 in plate 52.

As soon as the fingers 11 and 11a have grasped the filament, the filament nest 9 is moved out of encompassing relationship with respect to the filament, i.e., from the position thereof shown in solid to the phantom position as illustrated in FIGURE 3 and described above. The contour of the cam 4 (FIGS. 10 and 11) which drives the filament transfer apparatus is such that the forward stroke of shaft 18 is interrupted momentarily until this displacement of the filament nest has been effected.

As soon as the nest 9 has been displaced, the fingers 11 and 11a, with the filament gripped therebetween, are advanced from the position shown in solid to the phantom position as shown in FIGURES 1 and 11, thereby presenting the filament to the hooked ends of lead-in wires 19 and 21 as shown in these figures and also in FIGURE 2. When the shaft 18 renews its forward stroke it carries with it the sleeve 20 and all parts mounted on and supported by it since, as noted above, the block 16 attached to shaft 18 abuts the rear end of sleeve 20. As the shaft and sleeve move forward together, they advance within hubs 22 and 24 of bracket 2 and the sleeve 20 is guided by guide arm 26 which is attached thereto and slides forward on guide rod 28 until it engages stop 64 on hub 22. With the legs of the filament now disposed within the hooked ends of the lead-in wires 19 and 21, suitable clamping means, not shown, close the hooks on the legs of the filament thereby securing it to the lead-in wires.

The first step in the return of the filament transfer apparatus to its normal rest position is the opening of the jaws 11 and 11a from gripping engagement with the legs of the filament. In essence, this is accomplished by a reversal of the operation which effected a closing of the jaws on the legs of the filament when the filament was still in the nest 9. Opening of the jaws is effected as the shaft 18 starts back and the node 18a thereon deflects camming pin 60 and causes counter-clockwise rotation of the finger support 40 about its pivot pin 42. At this point, the fingers 11a are open and the stop block 58 on shaft 18 has moved back into engagement with leg 56c of slide 56. Further rearward movement of the shaft 18 thus returns the slide 56 to its normal rest position as shown in FIGURE 1 and the slide 56 draws with it the finger support 40 and returns the fingers 11a to the position thereof shown in FIGURE 1.

With the leg 56c of slide 56 now locked between block 58 on shaft 18 and block 34 mounted on sleeve 20, the remainder of the return stroke of shaft 18 to its normal rest position carries the sleeve 20 and all parts mounted thereon with it, thus returning the entire filament transfer apparatus to its normal position as shown in FIGURE 11.

What we claim is:

1. The method of preparing a coiled filament for assembly with support wires therefor in the manufacture of electric lamps and the like which comprises: positioning said coiled filament in a nest open at its ends and having an opening in a side along the longitudinal axis thereof; introducing a pair of blades through said longitudinally extending opening in said nest and between turns of said coiled filament near but spaced from each end thereof; effecting relative movement of said blades away from one another while disposed between turns of said coiled filament whereby a stretching of said coiled filament is effected and the ends of said coiled filament extend beyond the open ends of said nest; and terminating said relative movement of said blades when the over-all length of said stretched coiled filament has reached a pre-determined amount.

2. The method of preparing a coiled filament for assembly with support wires therefor in the manufacture of electric lamps and the like which comprises: positioning said coiled filament in a nest with one end thereof abutting a stop said nest being open at its ends and having an opening in a side along the longitudinal axis thereof; introducing a first blade through said longitudinally extending opening in said nest and between turns of said coiled filament near but spaced from said one end of said coiled filament; introducing a second blade through said longitudinally extending opening in said nest and between turns of said coiled filament near but spaced from the other end of said coiled filament; moving said second blade, while so disposed between turns of said coiled filament, away from said first blade whereby a stretching of said coiled filament is effected and the ends of said coiled filament extend beyond the opens ends of said nest; and terminating said movement of said second blade when the end of said coiled filament adjacent thereto engages a second stop.

3. The method of preparing a coiled filament for assembly with support wires therefor in the manufacture of electric lamps and the like which comprises: positioning said coiled filament in a nest open at its ends and having an opening in a side along the longitudinal axis thereof; introducing a pair of blades through said longitudinally extending opening in said nest and between turns of said coiled filament near but spaced from each end thereof; effecting relative movement of said blades away from one another while disposed between turns of said coiled filament whereby a stretching of said coiled filament is effected and the ends of said coiled filament extend beyond the open ends of said nest; terminating said relative movement of said blades when the over-all length of said stretched coiled filament has reached a pre-determined amount; gripping the ends of said coiled filament which extend beyond the open ends of said nest; removing said blades from engagement with said coiled filament; removing said nest from encompassing relationship with respect to said coiled filament; and presenting said coiled filament so gripped to said support wires.

4. The method of preparing a coiled filament for assembly with support wires therefor in the manufacture of electric lamps and the like which comprises: positioning said coiled filament in a nest with one end thereof abutting a stop said nest being open at its ends and having an opening in a side thereof along its longitudinal axis thereof; introducing a first blade through said longitudinally extending opening in said nest and between turns of said coiled filament near but spaced from said one end of said coiled filament; introducing a second blade through said longitudinally extending opening in said nest and between turns of said coiled filament near but spaced from the other end of said coiled filament; moving said second blade, while so disposed between turns of said coiled filament, away from said first blade whereby a stretching of said coiled filament is effected and the ends of said coiled filament extend beyond the open ends of said nest; terminating said movement of said second blade when the end of said coiled filament adjacent thereto engages a second stop; gripping the ends of said coiled filament which extend beyond the open ends of said nest; removing said blades from engagement with said coiled filament; removing said nest from encompassing relationship with respect to said coiled filament, and presenting said coiled filament so gripped to said support wires.

5. Apparatus for preparing a coiled filament for assembly with support wires therefor in the manufacture of electric lamps and the like comprising: a nest; means for introducing a coiled filament into said nest; a first stop disposed adjacent to but spaced from one end of said nest; a second stop disposed adjacent to but spaced from the other end of said nest; a pair of blades; means for reciprocating said blades into and out of engagement with said coiled filament between turns thereof, each of said blades engaging said coiled filament near but spaced from an end thereof; means for effecting relative displacement of said blades away from one another while disposed in said filament-engaging position whereby stretching of the coiled filament is effected; means for arresting said relative movement of said blades away from one another as soon as the ends of said coiled filament have engaged said stops; means for securing said blades in said displaced position to thereby retain said coiled filament in the stretched state; article transfer means; and means for advancing said article transfer means into gripping engagement with said stretched coiled filament, said blades being retracted from their filament-engaging position after said article transfer means has gripped said stretched coiled filament.

6. Apparatus for preparing a coiled filament for assembly with support wires therefor in the manufacture of electric lamps and the like comprising: a nest; means for introducing a coiled filament into said nest; a first stop disposed adjacent to but spaced from one end of said nest; a second stop disposed adjacent to but spaced from the other end of said nest; a pair of blades; means for reciprocating said blades into and out of engagement with said coiled filament between turns thereof, each of said blades engaging said coiled filament near but spaced from an end thereof; means for effecting relative displacement of said blades away from one another while disposed in said filament-engaging position whereby stretching of the coiled filament is effected; means for arresting said relative movement of said blades away from one another as soon as the ends of said coiled filament have engaged said stops; means for securing said blades in said displaced position to thereby retain said coiled filament in the stretched state; article transfer means; means for advancing said article transfer means into gripping engagement with said stretched coiled filament, said blades being retracted from their filament-engaging position after said article transfer means has gripped said stretched coiled filament; and means for thereafter advancing said article transfer means to present said stretched coiled filament to said support wires.

7. Apparatus for preparing a coiled filament for assembly with support wires therefor in the manufacture of electric lamps and the like comprising: a nest; means for introducing a coiled filament into said nest; a first stop disposed adjacent to but spaced from one end of said nest; a second stop disposed adjacent to but spaced from the other end of said nest; a pair of blades; means for reciprocating said blades into and out of engagement with said coiled filament between turns thereof, each of said blades engaging said coiled filament near but spaced from an end thereof; means for effecting relative displacement of said blades away from one another while disposed in said filament-engaging position whereby stretching of the coiled filament is effected; means for arresting said relative movement of said blades away from one another as soon as the ends of said coiled filament have engaged said stops; means for securing said blades in said displaced position to thereby retain said coiled filament in the stretched state; means for advancing said blades, with the coiled filament supported thereby and retained in said stretched state, to present said stretched coiled filament to a locus; article transfer means; and means for advancing said article transfer means to said locus and into gripping engagement with said stretched coiled filament, said blades being retracted from their filament-engaging position after said article transfer means has gripped said stretched coiled filament.

8. Apparatus for preparing a coiled filament for assembly with support wires therefor in the manufacture of electric lamps and the like comprising: a nest; means for introducing a coiled filament into said nest; a first stop disposed adjacent to but spaced from one end of said nest; a second stop disposed adjacent to but spaced from the other end of said nest; means for stretching said coiled filament in said nest; means for terminating said stretching of said coiled filament as soon as the ends of said coiled filament have engaged said stops; means for retaining said coiled filament in said stretched state; article transfer means; and means for advancing said article transfer means into gripping engagement with said stretched coiled filament.

References Cited in the file of this patent

UNITED STATES PATENTS

| | | |
|---|---|---|
| 1,830,222 | Brindle | Nov. 3, 1931 |
| 1,930,316 | Ledig et al. | Oct. 10, 1933 |
| 2,655,952 | Mann et al. | Oct. 20, 1953 |
| 2,781,796 | Dilts | Feb. 19, 1957 |
| 2,927,679 | Rively | Mar. 8, 1960 |
| 2,968,323 | Wolf | Jan. 17, 1961 |